(12) United States Patent
Seider et al.

(10) Patent No.: US 8,888,413 B2
(45) Date of Patent: Nov. 18, 2014

(54) TRANSITION COUPLING BETWEEN CYLINDRICAL DRIVE SHAFT AND HELICAL PILE SHAFT

(75) Inventors: Gary L. Seider, Centralia, MO (US); Shawn D. Downey, Columbia, MO (US); Jacob C. Atchley, Columbia, MO (US); Kelly S. Hawkins, Centralia, MO (US)

(73) Assignee: Hubbell Incorporated, Shelton, CT (US)

( * ) Notice: Subject to any disclaimer, the term of this patent is extended or adjusted under 35 U.S.C. 154(b) by 611 days.

(21) Appl. No.: 12/942,296

(22) Filed: Nov. 9, 2010

(65) Prior Publication Data

US 2012/0114425 A1    May 10, 2012

(51) Int. Cl.
| | |
|---|---|
| *E02D 5/28* | (2006.01) |
| *E02D 5/72* | (2006.01) |
| *E02D 5/22* | (2006.01) |
| *E02D 5/24* | (2006.01) |
| *E02D 7/22* | (2006.01) |
| *E02D 5/52* | (2006.01) |
| *E02D 5/54* | (2006.01) |
| *F16B 7/18* | (2006.01) |
| *E02D 5/56* | (2006.01) |

(52) U.S. Cl.
CPC ............... *E02D 5/523* (2013.01); *F16B 7/182* (2013.01); *E02D 5/56* (2013.01)
USPC ........... 405/231; 405/229; 405/232; 405/249; 405/250; 405/251; 405/252.1

(58) Field of Classification Search
USPC .............. 405/229, 231, 249, 250, 251, 252.1, 405/232, 257, 286, 293, 305, 259.1; 52/848, 849; 403/292, 300, 301, 305, 403/341
See application file for complete search history.

(56) References Cited

U.S. PATENT DOCUMENTS

| | | | | |
|---|---|---|---|---|
| 1,074,275 A | * | 9/1913 | MacLean | 405/224 |
| 1,227,105 A | * | 5/1917 | Barnes | 248/354.3 |

(Continued)

FOREIGN PATENT DOCUMENTS

| | | | | |
|---|---|---|---|---|
| WO | WO 93/12312 | 6/1993 | | |
| WO | WO 9906639 A1 | * | 2/1999 | E02D 5/80 |

OTHER PUBLICATIONS

Chance Civil Construction.Design, Installation and Testing of Helical Piles and Anchors. Apr. 8, 2009; Link: http://www.foundationperformance.org/technical_papers.cfm.*

(Continued)

*Primary Examiner* — Benjamin Fiorello
*Assistant Examiner* — Edwin Toledo-Duran
(74) *Attorney, Agent, or Firm* — Alan I. Cantor; Mark S. Bicks; Alfred N. Goodman (57) ABSTRACT

An improved transition coupling for a helical soil pile assembly transfers a compression load between two coupled shaft segments with little or no compression loading on the bolts that fasten the parts together. The coupling body has a shaft-receiving socket that extends axially into the body from one end to a socket bottom that axially abuts the end of one of the shafts. The body also has at least one shoulder between its ends that extends laterally outward and faces toward the end remote from the socket. A cylindrical portion of the body, which fits closely within the hollow end of the other shaft, extends axially toward the socket end up to the shoulder, which is adapted to abut the end of that shaft. At least one pair of aligned transverse holes in the body is adapted to receive a fastener.

29 Claims, 10 Drawing Sheets

(56) References Cited

U.S. PATENT DOCUMENTS

| | | | | |
|---|---|---|---|---|
| 1,507,138 A * | 9/1924 | Pierce | ................... | 285/334.5 |
| 1,832,404 A * | 11/1931 | Marsden | ................... | 405/250 |
| 2,135,389 A * | 11/1938 | Dempsey | ................... | 52/296 |
| 2,260,811 A * | 10/1941 | Kozak | ................... | 403/19 |
| 2,341,272 A * | 2/1944 | Firth et al. | ................... | 474/170 |
| 2,362,856 A * | 11/1944 | Strunk et al. | ................... | 403/182 |
| 2,584,015 A * | 1/1952 | Hawes | ................... | 248/354.4 |
| 2,829,503 A * | 4/1958 | Hayes | ................... | 173/128 |
| 2,883,223 A * | 4/1959 | Petersen | ................... | 403/301 |
| 3,080,749 A * | 3/1963 | Hollander | ................... | 73/843 |
| 3,148,510 A * | 9/1964 | Sullivan | ................... | 405/259.1 |
| 3,178,210 A * | 4/1965 | Dickinson | ................... | 403/292 |
| 3,353,852 A * | 11/1967 | Wood | ................... | 403/189 |
| 3,356,168 A * | 12/1967 | Johnson | ................... | 175/394 |
| 3,360,285 A * | 12/1967 | Huckshold | ................... | 403/292 |
| 3,377,077 A * | 4/1968 | Hollander et al. | ................... | 279/158 |
| 3,382,937 A | 5/1968 | Watts | | |
| 3,410,097 A * | 11/1968 | Young | ................... | 405/255 |
| 3,504,500 A * | 4/1970 | Fristedt | ................... | 405/252 |
| 3,554,306 A * | 1/1971 | Wilburn | ................... | 175/320 |
| 3,662,436 A * | 5/1972 | Roza | ................... | 24/115 R |
| 3,748,863 A * | 7/1973 | Pogonowski et al. | ................... | 405/224 |
| 3,828,562 A * | 8/1974 | Petres | ................... | 405/259.1 |
| 3,832,861 A * | 9/1974 | Jahnke et al. | ................... | 52/127.5 |
| 3,986,570 A * | 10/1976 | Stinson et al. | ................... | 175/320 |
| 4,102,141 A * | 7/1978 | Ingalls | ................... | 405/232 |
| 4,239,419 A * | 12/1980 | Gillen, Jr. | ................... | 405/232 |
| 4,280,768 A * | 7/1981 | Pardue et al. | ................... | 403/3 |
| 4,290,245 A * | 9/1981 | Pardue et al. | ................... | 52/157 |
| 4,316,350 A | 2/1982 | Watson | | |
| 4,334,392 A * | 6/1982 | Dziedzic | ................... | 52/157 |
| 4,436,452 A * | 3/1984 | Bodine | ................... | 405/232 |
| 4,499,698 A * | 2/1985 | Hoyt et al. | ................... | 52/157 |
| RE32,076 E * | 2/1986 | Dziedzic | ................... | 405/303 |
| 4,607,984 A * | 8/1986 | Cassidy | ................... | 405/259.6 |
| 4,691,818 A * | 9/1987 | Weber | ................... | 198/666 |
| 4,754,588 A * | 7/1988 | Gregory | ................... | 52/294 |
| 4,803,812 A * | 2/1989 | Alexander, Sr. | ................... | 52/157 |
| 4,981,000 A * | 1/1991 | Hamilton et al. | ................... | 52/157 |
| 4,996,806 A * | 3/1991 | Platz | ................... | 52/157 |
| 5,004,095 A * | 4/1991 | Lapeyre et al. | ................... | 198/660 |
| 5,012,622 A * | 5/1991 | Sato et al. | ................... | 52/834 |
| 5,066,168 A * | 11/1991 | Holdeman | ................... | 405/249 |
| 5,139,235 A | 8/1992 | Kilmer | | |
| 5,145,286 A * | 9/1992 | Summers | ................... | 405/259.1 |
| 5,149,149 A * | 9/1992 | Wu | ................... | 285/402 |
| 5,295,766 A * | 3/1994 | Tiikkainen | ................... | 405/232 |
| 5,320,439 A * | 6/1994 | Perrault et al. | ................... | 403/379.1 |
| 5,477,929 A * | 12/1995 | Kenyon et al. | ................... | 172/372 |
| 5,531,544 A * | 7/1996 | Willcox, II | ................... | 405/231 |
| 5,542,784 A * | 8/1996 | Gårdenberg | ................... | 405/232 |
| 5,556,233 A * | 9/1996 | Kovago | ................... | 405/259.4 |
| 5,575,593 A * | 11/1996 | Raaf | ................... | 405/237 |
| 5,641,237 A * | 6/1997 | Albert et al. | ................... | 403/372 |
| 5,661,946 A * | 9/1997 | Davis | ................... | 52/849 |
| 5,690,181 A * | 11/1997 | Shu | ................... | 172/378 |
| 5,707,180 A * | 1/1998 | Vickars et al. | ................... | 405/233 |
| 5,829,922 A * | 11/1998 | Calandra et al. | ................... | 405/302.2 |
| 5,833,399 A * | 11/1998 | Bullivant | ................... | 405/233 |
| 5,967,693 A * | 10/1999 | Braaten et al. | ................... | 403/383 |
| 5,975,808 A * | 11/1999 | Fujita | ................... | 405/244 |
| 5,979,854 A * | 11/1999 | Lundgren et al. | ................... | 248/354.3 |
| 6,074,133 A * | 6/2000 | Kelsey | ................... | 405/244 |
| 6,152,424 A * | 11/2000 | Lapat | ................... | 254/98 |
| 6,183,167 B1 * | 2/2001 | Ruiz et al. | ................... | 405/251 |
| 6,264,402 B1 * | 7/2001 | Vickars et al. | ................... | 405/239 |
| 6,352,391 B1 * | 3/2002 | Jones | ................... | 405/252.1 |
| 6,412,236 B1 | 7/2002 | Johnson | | |
| 6,615,554 B2 * | 9/2003 | Rupiper | ................... | 52/157 |
| 6,641,332 B1 * | 11/2003 | Alvarado | ................... | 405/232 |
| 6,659,692 B1 * | 12/2003 | May | ................... | 405/232 |
| 6,669,400 B1 * | 12/2003 | Sergi | ................... | 403/379.3 |
| 6,709,234 B2 | 3/2004 | Gilbert et al. | | |
| 6,722,821 B1 * | 4/2004 | Perko et al. | ................... | 405/249 |
| 6,814,525 B1 * | 11/2004 | Whitsett | ................... | 405/233 |
| 6,872,031 B2 * | 3/2005 | May | ................... | 405/232 |
| 7,037,045 B2 * | 5/2006 | Jones | ................... | 405/252.1 |
| 7,090,437 B2 * | 8/2006 | Pinkleton | ................... | 405/244 |
| 7,112,012 B2 * | 9/2006 | Whitsett | ................... | 405/233 |
| 7,165,915 B2 * | 1/2007 | Queen | ................... | 405/244 |
| 7,195,426 B2 * | 3/2007 | May | ................... | 405/230 |
| 7,220,081 B1 * | 5/2007 | Gantt, Jr. | ................... | 405/230 |
| 7,314,335 B2 * | 1/2008 | Whitsett | ................... | 405/233 |
| 7,416,367 B2 * | 8/2008 | St. Onge et al. | ................... | 405/230 |
| 7,465,128 B2 * | 12/2008 | Bruneau | ................... | 405/259.3 |
| 7,510,350 B2 * | 3/2009 | Ronnkvist | ................... | 405/250 |
| 7,581,707 B2 * | 9/2009 | Saraf | ................... | 248/530 |
| 7,625,151 B2 | 12/2009 | Li et al. | | |
| 7,645,096 B2 * | 1/2010 | Hedrick | ................... | 405/259.1 |
| 7,722,286 B2 * | 5/2010 | Heald | ................... | 404/9 |
| 7,731,454 B1 * | 6/2010 | Watson et al. | ................... | 405/242 |
| 7,744,316 B2 * | 6/2010 | Kaufman | ................... | 405/230 |
| 7,854,451 B2 * | 12/2010 | Davis, II | ................... | 285/404 |
| 7,891,911 B2 * | 2/2011 | Tschernuth et al. | ................... | 405/259.3 |
| 7,896,579 B2 * | 3/2011 | Craig | ................... | 405/259.1 |
| 8,070,392 B2 * | 12/2011 | Gantt, Jr. | ................... | 405/252.1 |
| 2001/0028827 A1 * | 10/2001 | Vickars et al. | ................... | 405/233 |
| 2003/0095830 A1 * | 5/2003 | Nguyen et al. | ................... | 403/293 |
| 2003/0159839 A1 * | 8/2003 | Perko | ................... | 172/100 |
| 2004/0071511 A1 * | 4/2004 | May | ................... | 405/231 |
| 2006/0067794 A1 * | 3/2006 | Mitchell | ................... | 405/230 |
| 2007/0243025 A1 * | 10/2007 | Ronnkvist | ................... | 405/244 |
| 2008/0170912 A1 * | 7/2008 | Kaufman | ................... | 405/232 |
| 2009/0110488 A1 * | 4/2009 | Pearson | ................... | 405/251 |
| 2010/0143048 A1 * | 6/2010 | Lin | ................... | 405/244 |
| 2010/0202838 A1 * | 8/2010 | Weaver et al. | ................... | 405/259.1 |
| 2011/0194901 A1 * | 8/2011 | Jones | ................... | 405/252.1 |

OTHER PUBLICATIONS

Product Information Sheet for "Chance Helical Transition Coupler" of Hubbell Power Systems, Inc., Oct. 2006.

* cited by examiner

FIG. 24  FIG. 23

TRANSITION COUPLING BETWEEN CYLINDRICAL DRIVE SHAFT AND HELICAL PILE SHAFT

FIELD OF THE INVENTION

The present invention relates to installing piles in soil, in particular, to helical piles that are driven into soil by rotation of a shaft.

BACKGROUND OF THE INVENTION

A helical pile is a segmented deep foundation system with helical load-bearing plates usually welded to a central steel shaft. The helical plates usually have a uniform pitch and are spaced far enough apart so that they function independently as individual bearing elements. Installation typically involves driving the shaft in rotation by means of a hydraulic motor. Shaft segments (with or without load-bearing plates) may be added until a desired soil depth or load-bearing capacity is reached.

The central steel shafts that carry the helical bearing plates are typically square or round (i.e., circular) in cross-section. Round and square shaft segments may be used in combination, for example, in areas where soft/loose soils are located above the bearing strata (i.e., hard/dense soils) for the bearing plates. The round shaft, which has a greater section modulus, will resist columnar buckling in the soft/loose soil. The square shaft will allow adequate penetration of the helices into the hard/dense material to achieve proper load-bearing capacity without "spin-out," i.e., loss of thrust of the helices in the soft/loose material. Shaft segments typically are joined with complicated, costly fabricated transition couplings. Bolts, which fasten the shaft segments to the coupling, bear at least some of the axial compression load.

SUMMARY OF THE INVENTION

The invention provides an improved transition coupling for helical soil pile assemblies that transfers axial compression loads between the coupled shaft segments with little or no axial compression loading on the bolts that fasten the parts together.

According to one aspect, the invention is directed to a coupling for connecting a hollow end of a rotatable cylindrical first shaft to an end of a second shaft, the coupling comprising a body having a first end, a second end opposite the first end, and a longitudinal axis extending between the first end and the second end. The body comprises a socket having a side wall adapted to closely receive the end of the second shaft. The socket extends axially into the body from the second end to a socket bottom facing toward the second end and adapted to axially abut the end of the second shaft. The body also comprises at least one shoulder between the first end and the second end extending laterally outward from the body and facing toward the first end. The body further comprises a cylindrical portion adapted to fit closely within the hollow end of the first shaft. The cylindrical portion extends axially from the first end toward the second end up to the shoulder, which is adapted to abut the end of the first shaft. At least one pair of aligned transverse holes in the body is adapted to receive a fastener.

According to another aspect, the invention is directed to a coupling for connecting a hollow end of a rotatable cylindrical first shaft to an end of a second shaft, the coupling comprising a body having a first end, a second end opposite the first end, and a longitudinal axis extending between the first end and the second end. The body comprises a socket having a side wall adapted to closely receive the end of the second shaft. The socket extends axially into the body from the second end to a socket bottom adapted to axially abut the end of the second shaft. The body also comprises a cylindrical portion extending axially from the first end toward the second end and beyond the socket bottom, and a first pair of aligned transverse holes in the side wall of the socket, which is adapted to receive a fastener. Preferably, the first pair of aligned transverse holes are in the cylindrical portion, which preferably has a second pair of aligned transverse holes adapted to receive another fastener.

Coupling embodiments can be configured to join two cylindrical shafts or to join two shafts having distinctly different cross-sections, such as a cylindrical shaft and a square shaft. As to all coupling embodiments, it is preferred that the body be formed as one piece by any suitable process, such as casting, forging, machining, etc., and that it taper inwardly near and toward the second end, through which the socket extends.

The invention also is directed to a helical soil pile assembly that incorporates any of the coupling embodiments outlined above.

Additional features and advantages of the invention will be apparent from the following detailed description.

BRIEF DESCRIPTION OF THE DRAWING FIGURES

Preferred embodiments of the invention are described in detail below, purely by way of example, with reference to the accompanying drawing, in which.

DETAILED DESCRIPTION OF THE INVENTION

Figure 1:
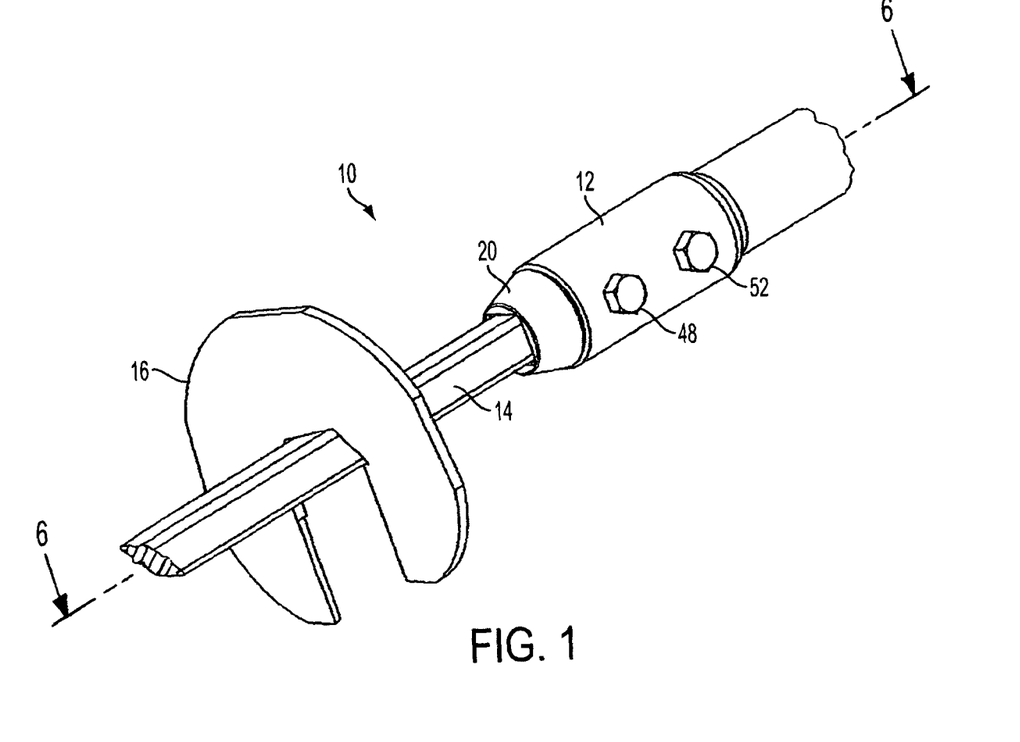
FIG. 1 is a perspective view of a helical soil pile assembly incorporating a coupling according to a first embodiment of the invention.
Figure 2:
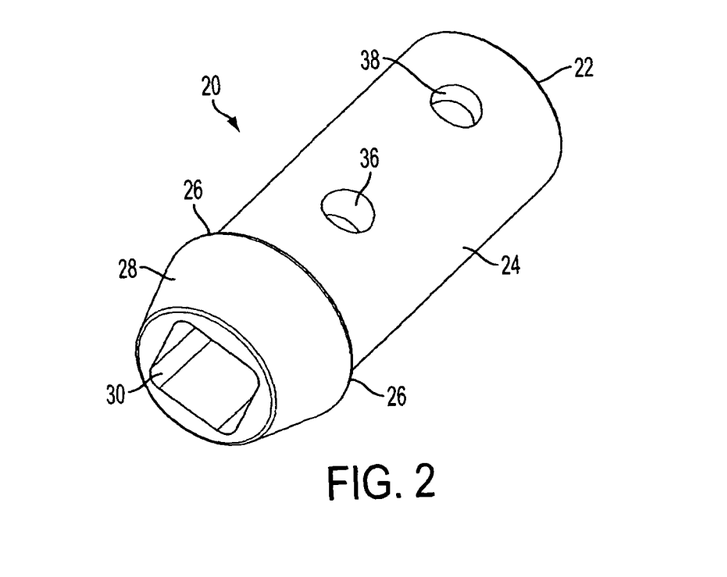
FIG. 2 is a perspective view of the coupling of FIG. 1.
Figure 3:
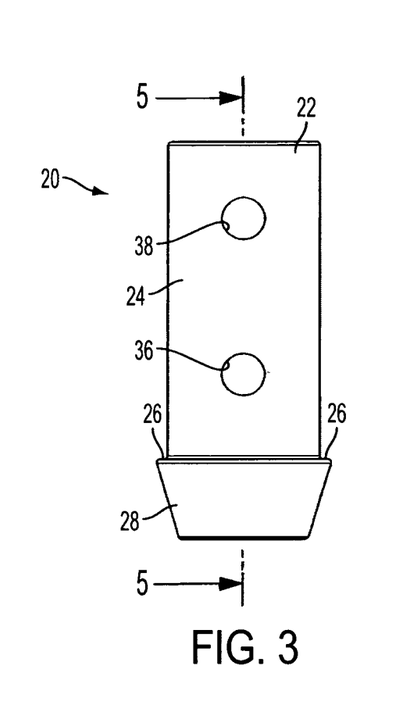
FIG. 3 is a side elevational view of the coupling of FIG. 1.
Figure 4:
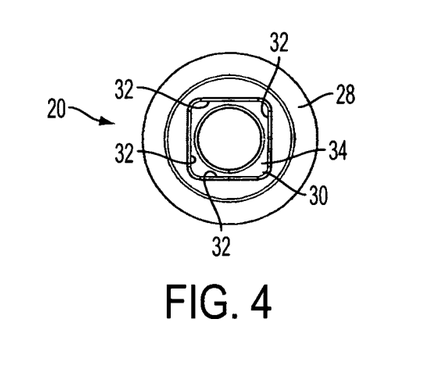
FIG. 4 is an end elevational view of the coupling of FIG. 1.
Figure 5:
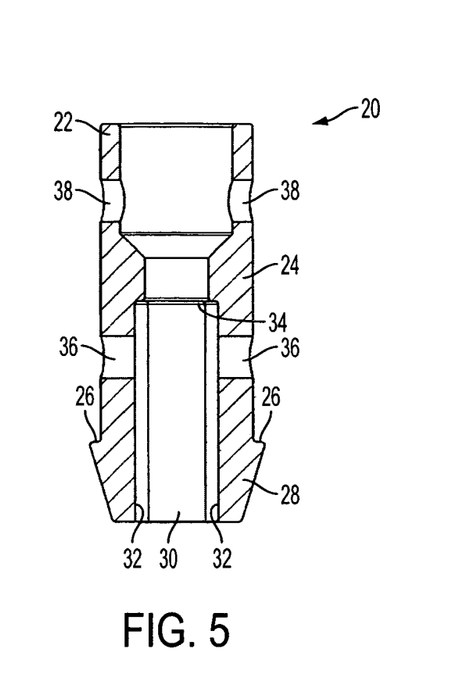
FIG. 5 is a side elevational view in longitudinal cross-section of the coupling of FIG. 1 taken along line 5-5 in FIG. 3.

FIG. 1 depicts a helical soil pile assembly 10 that incorporates a coupling 20 according to a first embodiment of the invention. Coupling 20 joins a round (cylindrical) shaft 12 to a square shaft 14, to which at least one helical load-bearing plate 16 may be welded. Alternatively, shaft 14 may be an extension shaft devoid of load-bearing plates. As explained below, a bolt 48, and preferably an additional bolt 52, secure the parts together.

Referring to FIGS. 2-5, coupling 20 comprises a hollow body 22 preferably formed as one piece, preferably of iron or steel. The body is symmetrical about two mutually orthogonal planes that intersect along its central longitudinal axis. The body has a cylindrical portion 24 that extends from one end of the body to an annular shoulder 26, which extends laterally outward. The body also has a nose portion 28 that extends from shoulder 26 to the other end of the body, tapering inwardly. The taper facilitates soil penetration during installation, minimizing soil disturbance. A substantially square socket 30 extends axially into body 22 through nose portion 28, beyond shoulder 26 and into cylindrical portion 24. The side wall of socket 30 comprises two pairs of opposite side walls 32 and terminates in an inner end defined by a shoulder 34 that faces toward the open end of the socket. A pair of aligned transverse holes 36 extend through socket 30 in cylindrical portion 24. Preferably, another pair of aligned transverse holes 38 extend through cylindrical portion 24 remote from socket 30.

Figure 6:
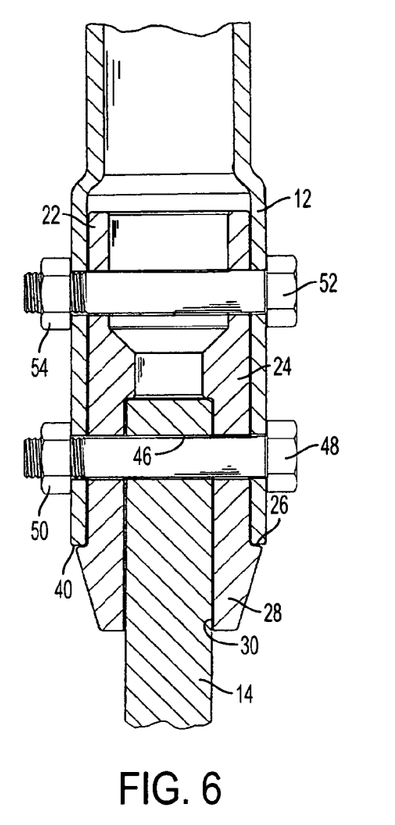
FIG. 6 is a side elevational view in longitudinal cross-section of the assembly of FIG. 1 taken along line 6-6 in FIG. 1.
Figure 7:
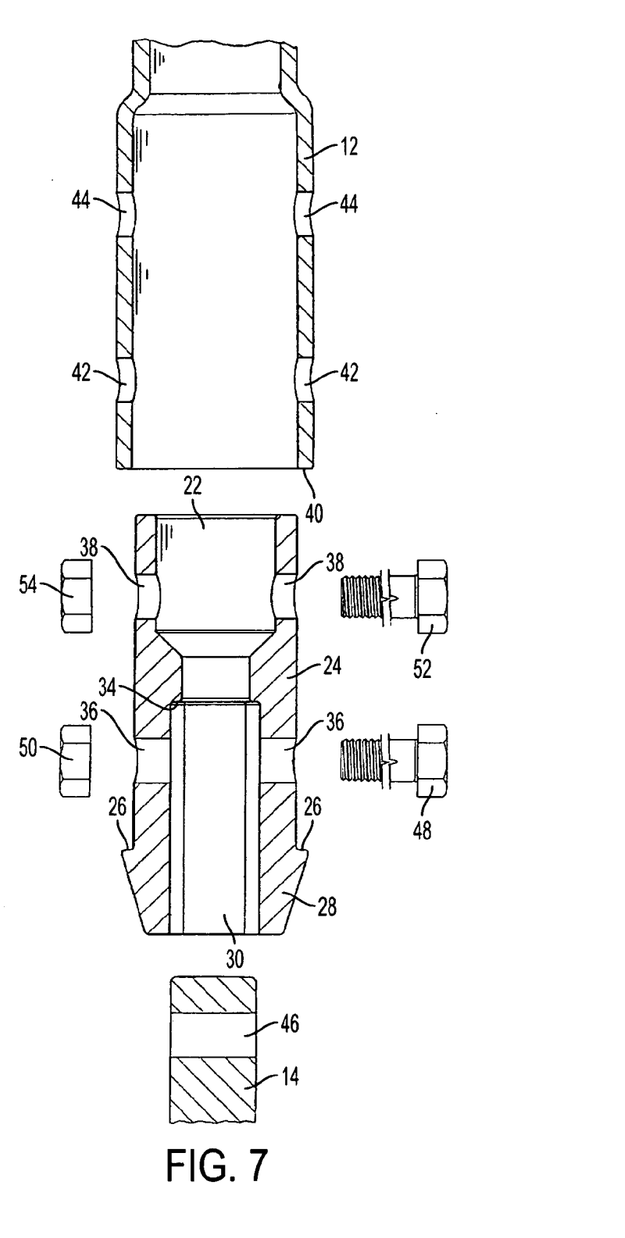
FIG. 7 is an exploded view in longitudinal cross-section of the assembly of FIG. 1.

FIGS. 6 and 7 illustrate how coupling 20 is joined to a round shaft 12 and a square shaft 14. Cylindrical portion 24 is sized to fit closely within a round shaft 12, with the end 40 of round shaft 12 abutting shoulder 26. Round shaft 12 has a pair of aligned transverse holes 42 near its end 40, and another pair of transverse holes 44 spaced further from end 40. Socket 30 is sized to closely receive a square shaft 14, with the end of shaft 14 abutting shoulder 34. Square shaft 14 has a transverse hole 46 near its end. When the three parts are assembled, holes 42 in round shaft 12 align with holes 36 in body 22 and with hole 46 in square shaft 14. A bolt 48 placed through these aligned holes is secured by a nut 50 to fasten all three parts together. In addition, transverse holes 44 in round shaft 12 align with transverse holes 38 in body 22. A bolt 52 placed through these aligned holes is secured by a nut 54 to further secure the coupling 20 to round shaft 12. In use, axial compression loads applied to the assembly 10 are borne almost exclusively by shoulders 26 and 34, minimizing axial stress on fastening bolts 48, 52.

Figure 8:
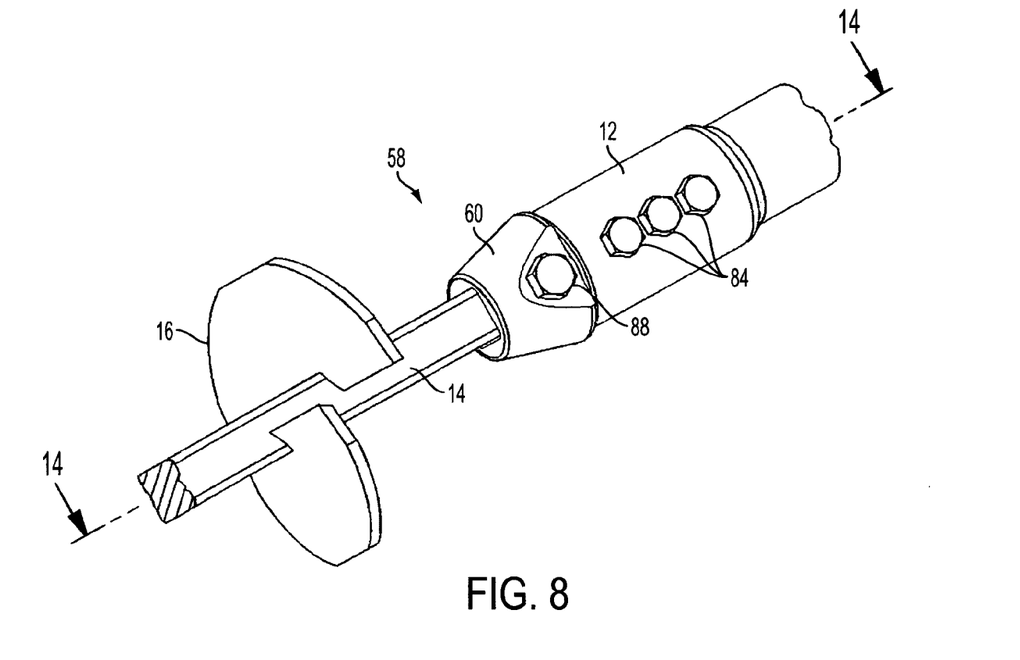
FIG. 8 is a perspective view of a helical soil pile assembly incorporating a coupling according to a second embodiment of the invention.
Figure 9:
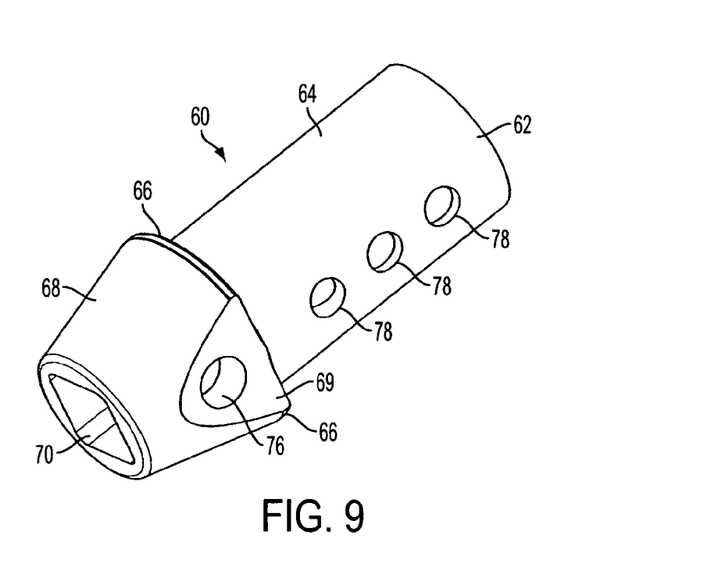
FIG. 9 is a perspective view of the coupling of FIG. 8.
Figure 10:
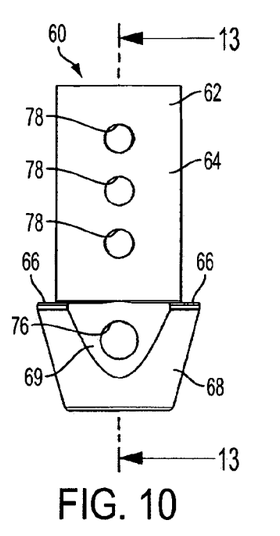
FIG. 10 is a side elevational view of the coupling of FIG. 8.
Figure 11:
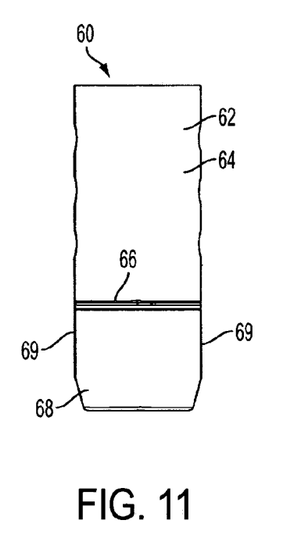
FIG. 11 is a side elevational view of the coupling of FIG. 8 taken at 90° to FIG. 10.
Figure 12:
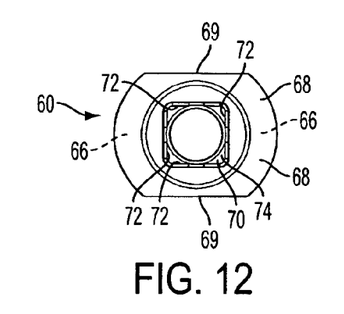
FIG. 12 is an end elevational view of the coupling of FIG. 8.
Figure 13:
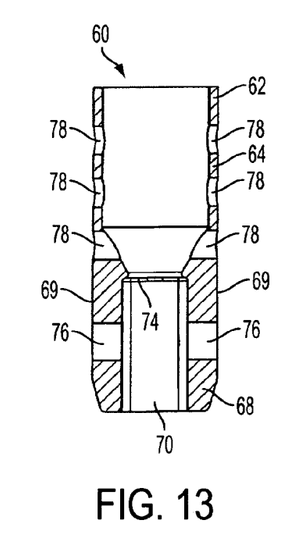
FIG. 13 is a side elevational view in longitudinal cross-section of the coupling of FIG. 8 taken along line 13-13 in FIG. 10.

FIG. 8 depicts a helical soil pile assembly 58 that incorporates a coupling 60 according to a second embodiment of the invention. Coupling 60 joins a round shaft 12 to a square shaft 14, to which at least one helical load-bearing plate 16 may be welded. Alternatively, shaft 14 may be an extension shaft devoid of load-bearing plates. As explained below, bolts 84, 88 secure the parts together.

Referring to FIGS. 9-13, coupling 60 comprises a hollow body 62 preferably formed as one piece, preferably of iron or steel. The body is symmetrical about two mutually orthogonal planes that intersect along its central longitudinal axis. The body has a cylindrical portion 64 that extends from one end of the body to a pair of diametrically opposed arcuate shoulders 66, which extend laterally outward. The body also has a nose portion 68 that extends from shoulders 66 to the other end of the body, tapering inwardly. The taper facilitates soil penetration during installation, minimizing soil disturbance. Two diametrically opposed flats 69 on nose portion 68 separate shoulders 66 from one another. A substantially square socket 70 extends axially into body 62 through nose portion 68, beyond shoulders 66. The side wall of socket 70 comprises two pairs of opposite side walls 72 and terminates in an inner end defined by a shoulder 74 that faces toward the open end of the socket. A pair of aligned transverse holes 76 extend through socket 70 in nose portion 64, opening on flats 69. A plurality (preferably three) pairs of aligned transverse holes 78 extend through cylindrical portion 64 remote from socket 70. Preferably, holes 76 in nose portion 68 are wider than holes 78 in cylindrical portion 64 so as to accommodate wider bolts.

Figure 14:
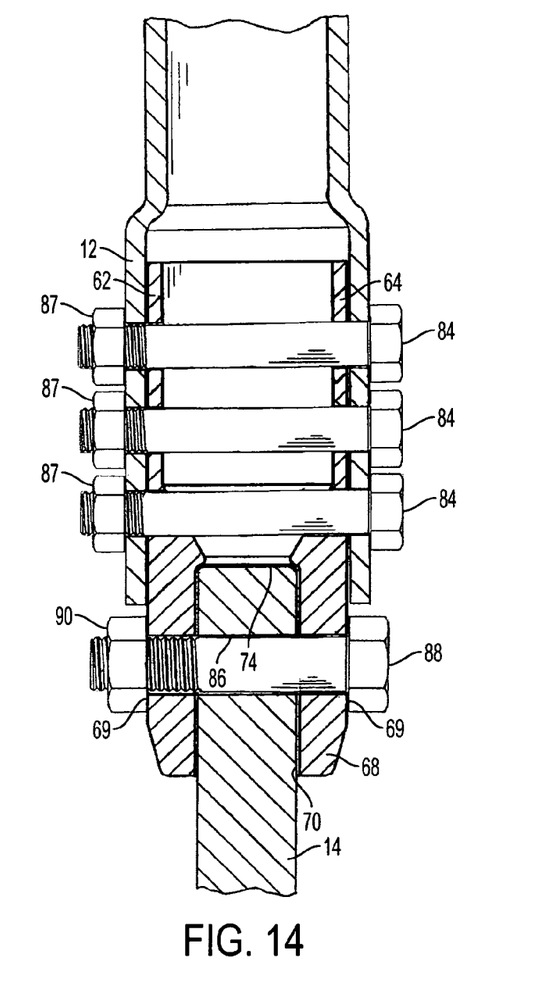
FIG. 14 is a side elevational view in longitudinal cross-section of the assembly of FIG. 8 taken along line 14-14 in FIG. 8.
Figure 15:
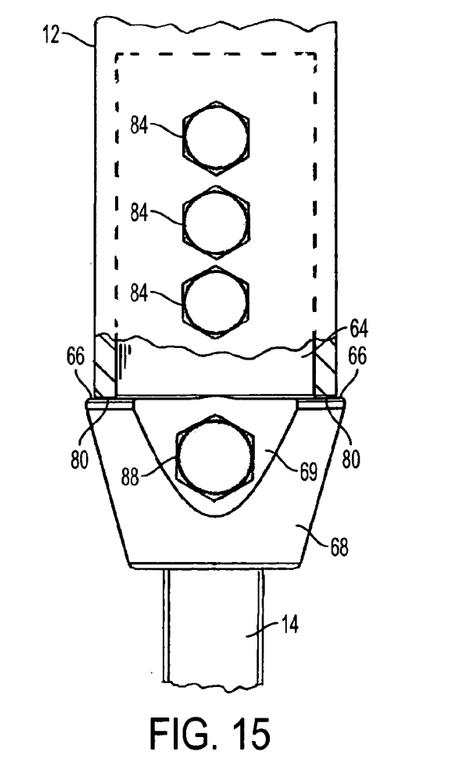
FIG. 15 is a partial side elevational view of the assembly of FIG. 8 taken at 90° to FIG. 14, with a portion of the cylindrical shaft broken away.
Figure 16:
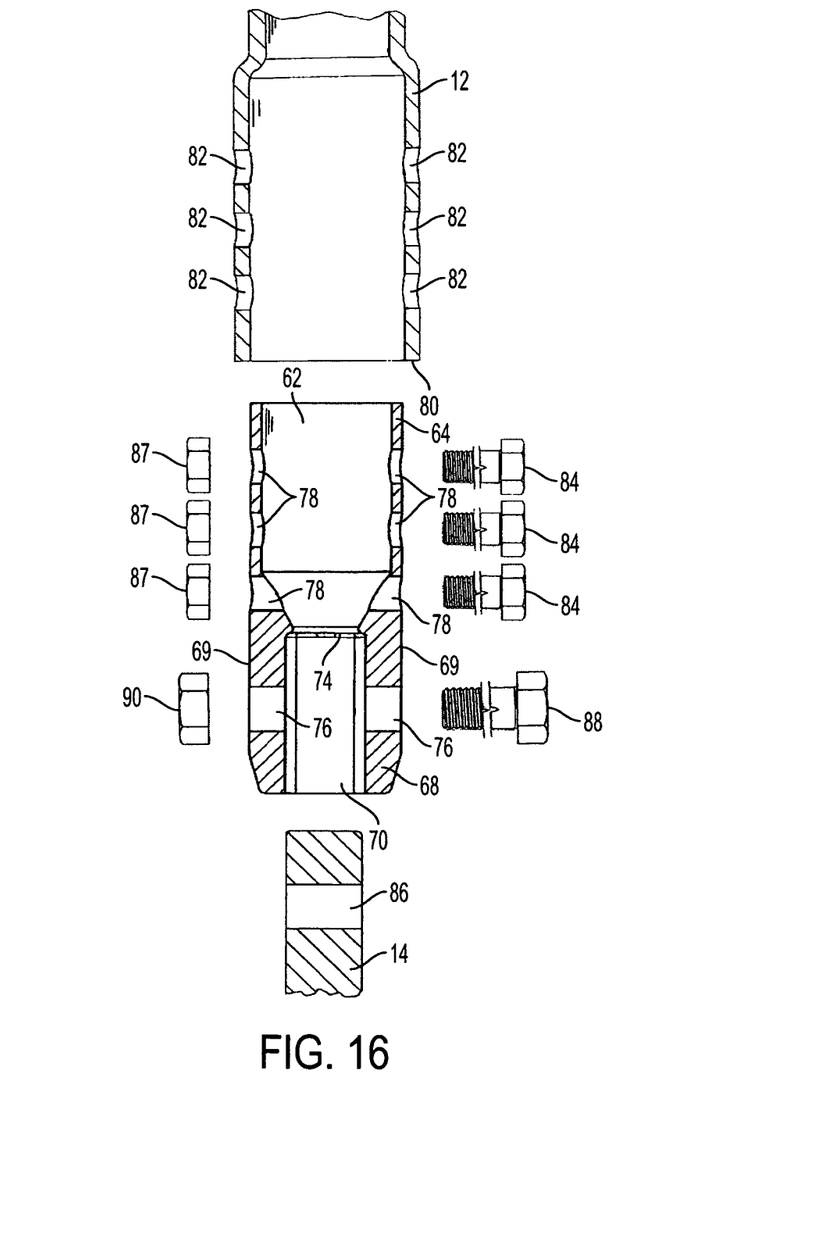
FIG. 16 is an exploded view in longitudinal cross-section of the assembly of FIG. 8.

FIGS. 14-16 illustrate how coupling 60 is joined to a round shaft 12 and a square shaft 14. Cylindrical portion 64 is sized to fit closely within a round shaft 12, with the end 80 of round shaft 12 abutting shoulders 66. Round shaft 12 has three pairs of aligned transverse holes 82. Socket 70 is sized to closely receive a square shaft 14, with the end of shaft 14 abutting shoulder 74. Square shaft 14 has a transverse hole 86 near its end. When the three parts are assembled, holes 82 in round shaft 12 align with holes 78 in body 62. A bolt 84 placed through each of these three sets of aligned holes is secured by a nut 87 to fasten round shaft 12 and coupling 60 together. In addition, hole 86 in square shaft 14 aligns with transverse holes 76 in nose portion 68. A bolt 88 placed through aligned holes 76, 86 is secured by a nut 90 to fasten square shaft 14 and coupling 60 together. When tightened, nut 90 and the head of bolt 88 bear against respective flats 69. In use, axial compression loads applied to the assembly 58 are borne almost exclusively by shoulders 66 and 74, minimizing axial stress on fastening bolts 84, 88.

Figure 17:
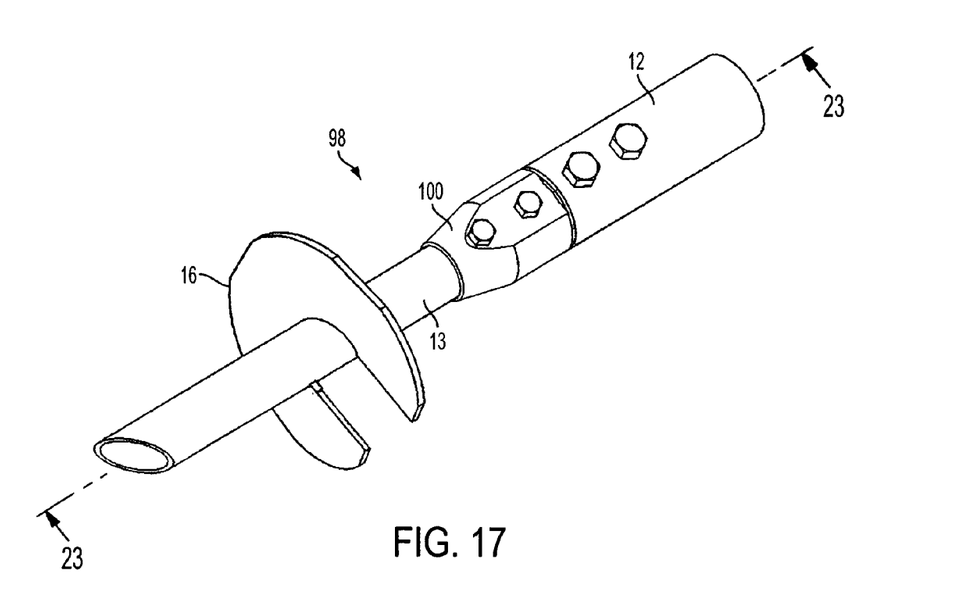
FIG. 17 is a perspective view of a helical soil pile assembly incorporating a coupling according to a third embodiment of the invention.
Figure 18:
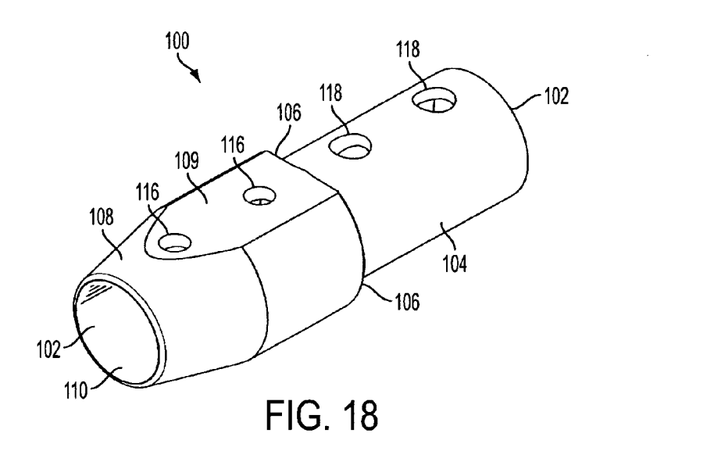
FIG. 18 is a perspective view of the coupling of FIG. 17.
Figure 19:
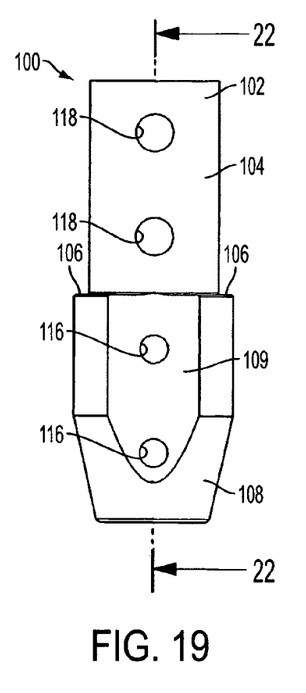
FIG. 19 is a side elevational view of the coupling of FIG. 17.
Figure 20:
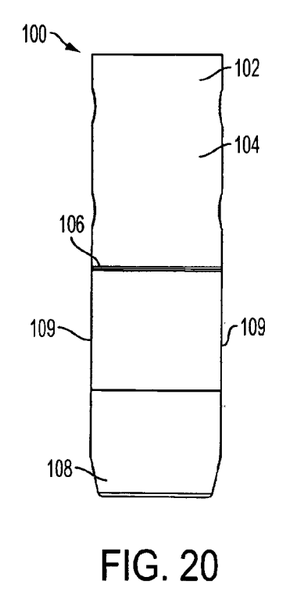
FIG. 20 is a side elevational view of the coupling of FIG. 17 taken at 90° to FIG. 19.
Figure 21:
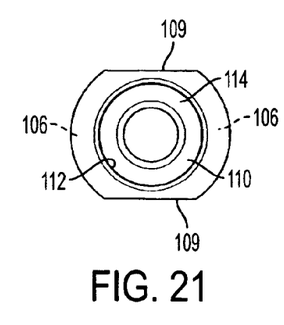
FIG. 21 is an end elevational view of the coupling of FIG. 17.
Figure 22:
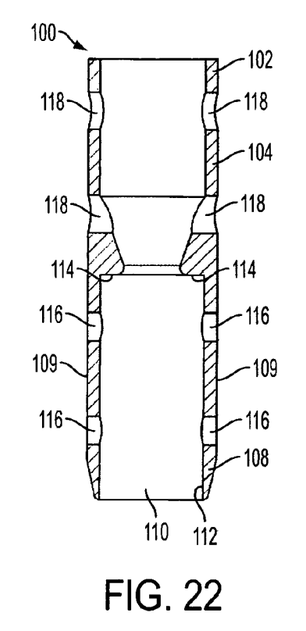
FIG. 22 is a side elevational view in longitudinal cross-section of the coupling of FIG. 17 taken along line 22-22 in FIG. 19.

FIG. 17 depicts a helical soil pile assembly 98 that incorporates a coupling 100 according to a third embodiment of the invention. Coupling 100 joins a round shaft 12 to a round shaft 13, to which at least one helical load-bearing plate 16 may be welded. Alternatively, shaft 13 may be an extension shaft devoid of load-bearing plates. As explained below, bolts 126, 130 secure the parts together.

Referring to FIGS. 18-22, coupling 100 comprises a hollow body 102 preferably formed as one piece, preferably of iron or steel. The body is symmetrical about two mutually orthogonal planes that intersect along its central longitudinal axis. The body has a cylindrical portion 104 that extends from one end of the body to a pair of diametrically opposed arcuate shoulders 106, which extend laterally outward. The body also has a nose portion 108 that tapers inwardly. The taper facilitates soil penetration during installation, minimizing soil disturbance. Two diametrically opposed flats 109 on and adjacent nose portion 108 separate shoulders 106 from one another. A cylindrical socket 110 extends axially into body 102 through nose portion 108, approximately up to the region of shoulders 106. The cylindrical side wall 112 of socket 110 terminates in an inner end defined by an annular shoulder 114 that faces toward the open end of the socket. Two pairs of aligned transverse holes 116 extend through socket 110, opening on flats 109. A plurality (preferably two) pairs of aligned transverse holes 118 extend through cylindrical portion 104 remote from socket 110. Preferably, holes 118 in cylindrical portion 104 are wider than holes 116 in nose portion 108 so as to accommodate wider bolts.

Figures 23, 24:
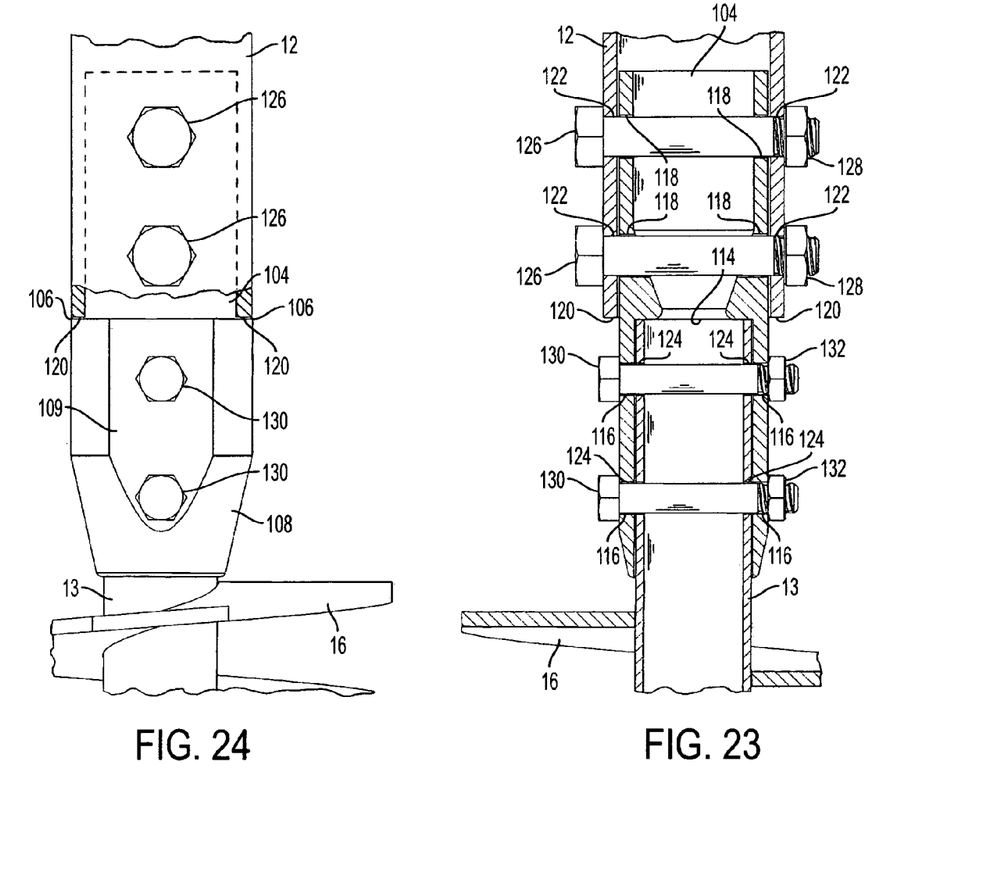
FIG. 23 is a side elevational view in longitudinal cross-section of the assembly of FIG. 17 taken along line 23-23 in FIG. 17.
FIG. 24 is a partial side elevational view of the assembly of FIG. 17 taken at 90° to FIG. 23, with a portion of the upper cylindrical shaft broken away.

FIGS. 23 and 24 illustrate how coupling 100 is joined to two round shafts 12 and 13. Cylindrical portion 104 is sized to fit closely within round shaft 12, with the end 120 of shaft 12 abutting shoulders 106. Shaft 12 has two pairs of aligned transverse holes 122. Socket 110 is sized to closely receive shaft 13, with the end of shaft 13 abutting annular shoulder 114. Shaft 13 has two pairs of aligned transverse holes 124 near its end. When the three parts are assembled, holes 122 in shaft 12 align with holes 118 in body 102. A bolt 126 placed through each of these two sets of aligned holes is secured by a nut 128 to fasten shaft 12 and coupling 100 together. In addition, holes 124 in shaft 13 align with transverse holes 116 through socket 110. A bolt 130 placed through each of these two sets of aligned holes is secured by a nut 132 to fasten shaft 13 and coupling 100 together. When tightened, nuts 132 and the heads of bolts 130 bear against respective flats 109. In use, axial compression loads applied to the assembly 98 are borne almost exclusively by shoulders 106 and 114, minimizing axial stress on fastening bolts 126, 130.

While various embodiments and have been chosen to illustrate the invention, it will be understood by those skilled in the art that various changes and modifications may be made. For example, any of the couplings described above can be provided with a differently configured socket: the couplings of FIGS. 1 and 8 could be provided with a cylindrical socket to accommodate a round shaft; and the coupling of FIG. 17 could be provided with a square socket to accommodate a square shaft. Alternatively, the sockets in these couplings could be configured to accommodate shafts that are neither square nor round. Other modifications may be made without departing from the scope of the invention as defined by the appended claims.

We claim:

1. A pile coupling for connecting a hollow end portion of a rotatable cylindrical first pile shaft to an end portion of a second pile shaft, the pile coupling comprising:
   a metallic body formed as one piece having a first end, a second end opposite said first end, and a longitudinal axis extending between said first end and said second end, said body comprising
      a socket having a side wall adapted to closely receive the end portion of the second pile shaft, said socket extending axially into said body from said second end to a socket bottom which faces toward said second end and confronts the second pile shaft, when assembled;
      a shoulder between said first end and said second end extending laterally outward from said body and facing toward said first end;
      a cylindrical portion adapted to fit closely within the hollow end portion of the first pile shaft, said cylindrical portion extending axially from said first end toward said second end, beyond said socket bottom and up to said shoulder, which confronts the first pile shaft when assembled; and
      a first pair of aligned transverse fastener holes in said cylindrical portion between said shoulder and said socket bottom and extending through said side wall of said socket.

2. The pile coupling of claim 1, wherein said body is inwardly tapered near and toward said second end.

3. The pile coupling of claim 2, wherein said body is inwardly tapered from said shoulder toward said second end.

4. The pile coupling of claim 1, further comprising a second pair of aligned transverse fastener holes in said cylindrical portion.

5. The pile coupling of claim 1, wherein said shoulder comprises a substantially continuous annular shoulder.

6. The pile coupling of claim 1, wherein said socket is substantially square.

7. The pile coupling of claim 1, wherein said socket is cylindrical.

8. A helical soil pile assembly, comprising:
   a rotatable cylindrical first pile shaft having a hollow end portion with a first pair of aligned transverse holes extending therethrough;
   a second pile shaft having an end portion with a transverse hole therethrough and having, or operatively connected to a pile shaft having at least one laterally extending helical plate embedded in soil; and
   a coupling connecting said hollow end portion of said first pile shaft to said end portion of said second pile shaft, said coupling comprising a metallic body formed as one piece having a first end, a second end opposite said first end and a longitudinal axis extending between said first end and said second end, said body comprising
      a socket having a side wall closely receiving said end portion of said second pile shaft, said socket extending axially into said body from said second end to a socket bottom which faces toward said second end and confronts said end portion of said second pile shaft;
      a shoulder between said first end and said second end extending laterally outward from said body and facing toward said first end;
      a cylindrical portion fitting closely within said hollow end of said first pile shaft, said cylindrical portion extending axially from said first end toward said second end, beyond said socket bottom and up to said shoulder, which confronts said hollow end of said first pile shaft; and
      a first pair of aligned transverse holes in said cylindrical portion between said shoulder and said socket bottom extending through said side wall of said socket in alignment with said transverse hole in said second pile shaft and aligned with said first pair of holes in said first pile shaft, and
   a first fastener in all of said aligned holes securing said first pile shaft, said second pile shaft and said coupling together.

9. The helical soil pile assembly of claim 8, further comprising a second pair of aligned transverse holes in said first pile shaft, a second pair of aligned transverse holes in said cylindrical portion of said body aligned with said second pair of transverse holes in said first pile shaft, and a second fastener extending through said aligned second pairs of transverse holes.

10. The helical soil pile assembly of claim 8, wherein said shoulder comprises a substantially continuous annular shoulder.

11. The helical soil pile assembly of claim 8, wherein said socket is substantially square, and said second pile shaft has a substantially square cross-section.

12. The helical soil pile assembly of claim 8, wherein said socket is cylindrical, and said second pile shaft has a round cross-section.

13. A pile coupling for connecting a hollow end portion of a rotatable cylindrical first pile shaft to an end portion of a second pile shaft, the pile coupling comprising:
   a metallic body formed as one piece having a first end, a second end opposite said first end, and a longitudinal axis extending between said first end and said second end, said body comprising
      a socket having a side wall adapted to closely receive the end portion of the second pile shaft, said socket extending axially into said body from said second end to a socket bottom which faces toward said second end and confronts the second pile shaft, when assembled;
      at least one shoulder between said first end and said second end extending laterally outward from said body and facing toward said first end;
      a cylindrical portion adapted to fit closely within the hollow end portion of the first pile shaft, said cylindrical portion extending axially from said first end toward said second end and up to said at least one shoulder, which confronts the first pile shaft when assembled;
      a nose portion between said at least one shoulder and said second end, said nose portion tapering inwardly toward said second end and having a pair of diametrically opposed flats;
      a first pair of aligned transverse fastener holes in said nose portion extending through said flats and said side wall of said socket; and
      at least one pair of aligned transverse fastener holes in said cylindrical portion.

14. The pile coupling of claim 13, wherein said nose portion and said flats extend to said at least one shoulder, and said at least one shoulder comprises two shoulders separated by said flats.

15. The pile coupling of claim 14, further comprising at least one additional pair of aligned transverse fastener holes in said cylindrical portion.

16. The pile coupling of claim 13, further comprising at least one additional pair of aligned transverse fastener holes in said cylindrical portion.

17. The pile coupling of claim 13, wherein said flats extend beyond said nose portion toward said first end, further comprising a second pair of aligned transverse fastener holes extending through said flats and said side wall of said socket.

18. The pile coupling of claim 17, further comprising at least one additional pair of aligned transverse fastener holes in said cylindrical portion.

19. The pile coupling of claim 13, wherein said at least one shoulder comprises two shoulders separated by said flats.

20. The pile coupling of claim 19, wherein said flats are substantially parallel to said longitudinal axis.

21. The pile coupling of claim 13, wherein said socket is substantially square.

22. The pile coupling of claim 13, wherein said socket is cylindrical.

23. A helical soil pile assembly, comprising:
   a rotatable cylindrical first pile shaft having a hollow end portion with a first pair of aligned transverse holes extending therethrough;
   a second pile shaft having an end portion with at least one transverse hole therethrough and having, or operatively connected to a pile shaft having at least one laterally extending helical plate embedded in soil;
   a coupling connecting said hollow end portion of said first pile shaft to said end portion of said second pile shaft, said coupling comprising a metallic body formed as one piece having a first end, a second end opposite said first end and a longitudinal axis extending between said first end and said second end, said body comprising
      a socket having a side wall closely receiving said end portion of said second pile shaft, said socket extending axially into said body from said second end to a socket bottom which faces toward said second end and confronts said end portion of said second pile shaft,
      at least one shoulder between said first end and said second end extending laterally outward from said body and facing toward said first end,
      a cylindrical portion fitting closely within said hollow end of said first pile shaft, said cylindrical portion extending axially from said first end toward said second end and up to said at least one shoulder, which confronts said hollow end portion of said first pile shaft,
      a nose portion between said at least one shoulder and said second end, said nose portion tapering inwardly toward said second end and having a pair of diametrically opposed flats,
      a first pair of aligned transverse fastener holes in said nose portion extending through said flats and said side wall of said socket and aligned with said at least one transverse hole in said second pile shaft, and
      at least one pair of aligned transverse fastener holes in said cylindrical portion aligned with said first pair of transverse holes in said first pile shaft,
   a first fastener in said first pair of aligned transverse fastener holes of said nose portion and in said at least one transverse hole of said second pile shaft securing said coupling and second pile shaft together; and
   a second fastener in said at least one pair of aligned transverse fastener holes in said cylindrical portion and in said first pair of aligned transverse holes of said first pile shaft securing said coupling and said first pile shaft together.

24. The helical soil pile assembly of claim 23, wherein said nose portion and said flats extend to said at least one shoulder, and said at least one shoulder comprises two shoulders separated by said flats.

25. The helical soil pile assembly of claim 24, further comprising a second pair of aligned transverse fastener holes in said cylindrical portion of said coupling, a second pair of aligned transverse fastener holes in said first pile shaft, and a third fastener in said second pairs of aligned transverse fastener holes securing said coupling and said first pile shaft together.

26. The helical soil pile assembly of claim 23, wherein said flats extend beyond said nose portion toward said first end, further comprising a second pair of aligned transverse fastener holes extending through said flats and said side wall of said socket, at least one additional transverse hole in said second pile shaft, and an additional fastener in said second pair of transverse fastener holes in said flats and in said at least one additional transverse hole in said second pile shaft securing said coupling and said second pile shaft together.

27. The helical soil pile assembly of claim 26, further comprising a second pair of aligned transverse fastener holes in said cylindrical portion of said coupling, a second pair of aligned transverse fastener holes in said first pile shaft, and a third fastener in said second pairs of aligned transverse fastener holes securing said coupling and said first pile shaft together.

28. The helical soil pile assembly of claim 23, wherein said socket is substantially square, and said second pile shaft has a substantially square cross-section.

29. The helical soil pile assembly of claim 23, wherein said socket is cylindrical, and said second pile shaft has a round cross-section.

\* \* \* \* \*